J. F. CAMERON.
Cultivator.
No. 28,831. Patented June 26, 1860.
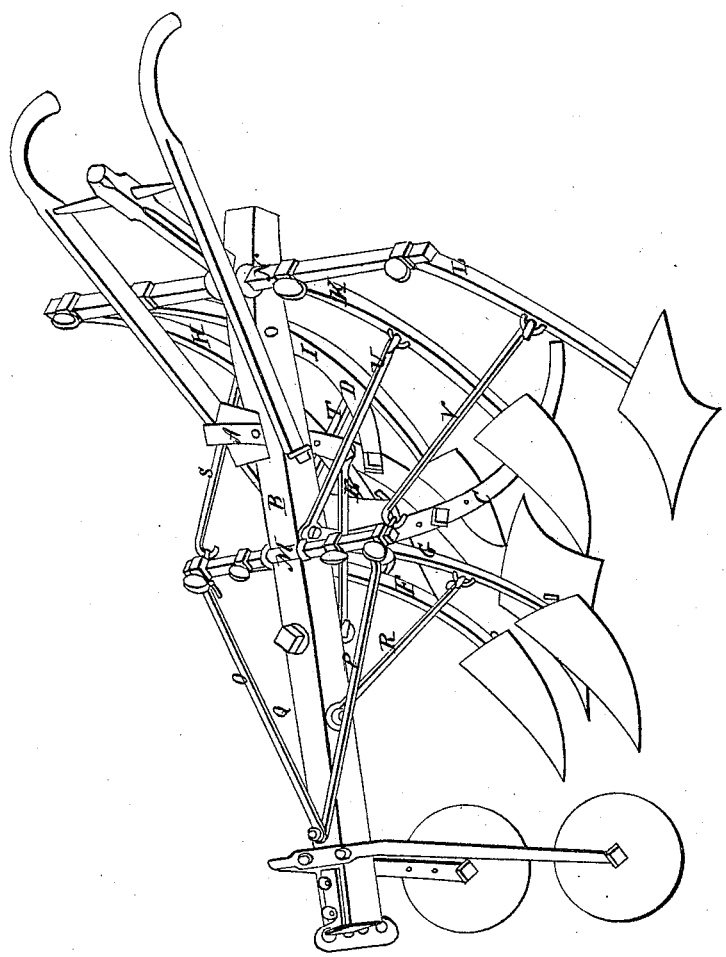
Witnesses:
H. King
A. N. Taft
Inventor:
Joshua F. Cameron
by his attorney
John B Clark

UNITED STATES PATENT OFFICE.

JOSHUA F. CAMERON, OF LIVINGSTON COUNTY, MISSOURI.

IMPROVEMENT IN CULTIVATORS.

Specification forming part of Letters Patent No. 28,831, dated June 26, 1860.

*To all whom it may concern:*

Be it known that I, JOSHUA F. CAMERON, of Livingston county and State of Missouri, have invented a new and Improved Turning Plow and Cultivator Combined, called the "King of Plows;" and I do hereby declare the following is an exact description thereof, reference being had to the accompanying drawings and letters of reference marked thereon.

This plow consists of a main helve (marked A) through main beam, (marked B,) to which is attached hind bar, C, and braces D E, so constructed that any formation of share right or left can be fastened on main helve by means of a screw through the socket into the helve, upon which the share is fastened, and by unscrewing or moving front brace and changing the hind bolt in the hind brace the beam can be raised or lowered to any pitch, and by means of different holes in different helves, bar, and braces, beam B can be hoisted or lowered to suit trashy or clean land and deep or shallow plowing.

My side plows or cultivating implements consist of six helves, three on each side of beam, (marked F G H I K L,) attached by means of eyes at the upper end to the crossbars, (marked M and N,) which bars are fastened to beam B by eyebolts, which are secured underneath the beam; also with eight braces (marked O P Q R S T U V) attached to the helves with an eye, and to the beam with bolts, and to the bar M with eyes, using two wheels in front in cultivating with two horses, and with a single horse but one, which regulates the depth of share and the pressure of the back-band on the horse. The wheels can be set up or down by means of holes in the wheel-iron. My six side helves are so arranged that I can have any formation of share attached to any part of my cultivator. If I wish to have my turning-share to throw the soil in or out, I change them to either side. If I wish a share revolving, throwing little or much soil to the plant, I take off my front helve and share and put the two others in their place. My shares are all made with sockets underneath, securely fastened to helve with a screw through socket in the helve. My side helves have eyes sliding at the top end on bars, with screws to fasten them down to the bar. My plow breaks up ground right or left. It furrows out. It cultivates. It does the work of the farm for plowing purposes. When I wish to break up ground I take off my cultivating implements, which can be readily done by unscrewing bolts in beam. When I am done breaking I take off my turning-plow and helve and put on my cultivating-bars and two of any kind of shares, one off each side, any distance from one to five feet, laying off or furrowing two rows at once, and by setting them in a little on bar I can cover the same rows when planting with one horse. When I wish to cultivate I add to or take from, as occasion may require. If I wish to cultivate with one horse, place a small helve in main beam using from one to three cultivating implements. If I wish two horses, one on either side of row, add all my helves and shares, taking out my center helve, expanding to any desired distance, which can be readily done by means of different holes in braces and beam. The holes may be lowered or raised on the same principle.

What I claim, and desire to secure by Letters Patent, is—

The within-described arrangement and combination of the rotary colters Z Z, beam B, bar C, helves A, F, G, H, I, K, and L, cross-bars M N, and braces D E O P Q R S T U V, in the manner and for the purposes set forth.

JOSHUA F. CAMERON.

Witnesses:
 DANL. G. SAUNDERS,
 J. M. DAVIS.